BEST AVAILABLE COPY

Sept. 4, 1928. Re. 17,075

A. S. REICHEL

MOTOR SHEARS

Original Filed Sept. 22, 1925 2 Sheets-Sheet 1

INVENTOR
Alvin S. Reichel
BY
Samuel O. Alcott
ATTORNEY

Sept. 4, 1928. Re. 17,075

A. S. REICHEL

MOTOR SHEARS

Original Filed Sept. 22, 1925 2 Sheets-Sheet 2

Inventor:
Alvin S. Reichel,
By Samuel O. Alcott
Atty

Reissued Sept. 4, 1928. Re. 17,075

UNITED STATES PATENT OFFICE.

ALVIN S. REICHEL, OF MATAMORAS, PENNSYLVANIA, ASSIGNOR, BY DIRECT AND MESNE ASSIGNMENTS, TO HAYES MFG. CO., INC., OF PORT JERVIS, NEW YORK, A CORPORATION OF NEW YORK.

MOTOR SHEARS.

Original No. 1,613,126, dated January 4, 1927, Serial No. 57,919, filed September 22, 1925. Application for reissue filed April 14, 1928. Serial No. 270,067.

This invention relates to portable motor driven shears and more particularly to shears operated by electricity and having means to control the starting and stopping of the shears at the will of the operator, and having a power transmission gear system arranged in such a manner as to operate the movable blade of the shears to effect a maximum power efficiency and convenience in the use and operation of the device.

One of the objects of the invention is, to provide a motor drive for the device so incorporated therein that the structure is substantially a unit, is readily and conveniently portable from place to place, and may be operated under any conditions where electrical energy may be obtained to actuate the driving motor.

Another object of the invention is, to provide a device of the character stated which will give a maximum of efficiency with a minimum of consumption of energy, and which shall have a minimum of weight and maximum of convenience and accuracy in operation as well as a maximum of variety of useful shearing applications.

Another object of the invention is, to provide a device of the character stated which shall have means by which the starting and stopping of the motor and shears may be instantly and conveniently effected at the will of the operator, and by which the cutting operation may be readily and precisely controlled, so that the greatest precision may be obtained in the use of the device.

Another object of the invention is, to provide a simple, strong, durable, and compact power transmission gearing system by means of which the power of the driving motor may be transmitted to the movable blades of the shears.

Another object is, to provide a device of this type and shears to co-operate therewith, such that the shears may be rigidly held in operative relation to the driving mechanism, during the cutting operation, and when and if desired, may be quickly and readily detached from the driving mechanism, to permit the installation in connection with the driving mechanism of such other shears of different pattern or type as may be required for different uses.

Another object is, to produce a device of this character which shall be of simple construction, of comparatively few parts, which shall be of light weight, which shall be readily portable, which shall be of the maximum efficiency and durability, and which shall be of comparatively small cost, and which shall be adaptable for a substantially unlimited variety of cutting uses, with particular reference to the cutting of sheet material, and which shall have other advantages and results that may appear hereafter in the following specification.

My invention consists in the particular combination, organization, and arrangement of parts described in the specification, illustrated in the accompanying drawings, and more particularly specified and defined in the appended claims made a part hereof.

In the accompanying drawings

Fig. 1 is a longitudinal sectional view through my improved shears, showing the arrangement of the motor driving mechanism, the co-operative relation of the power transmission gears therewith, the means by which the stationary blade of the cutting shears is rigidly but detachably held to the gear case, and the means by which the movable blade of the shears is caused to move and to perform the cutting operation.

Figure 1:
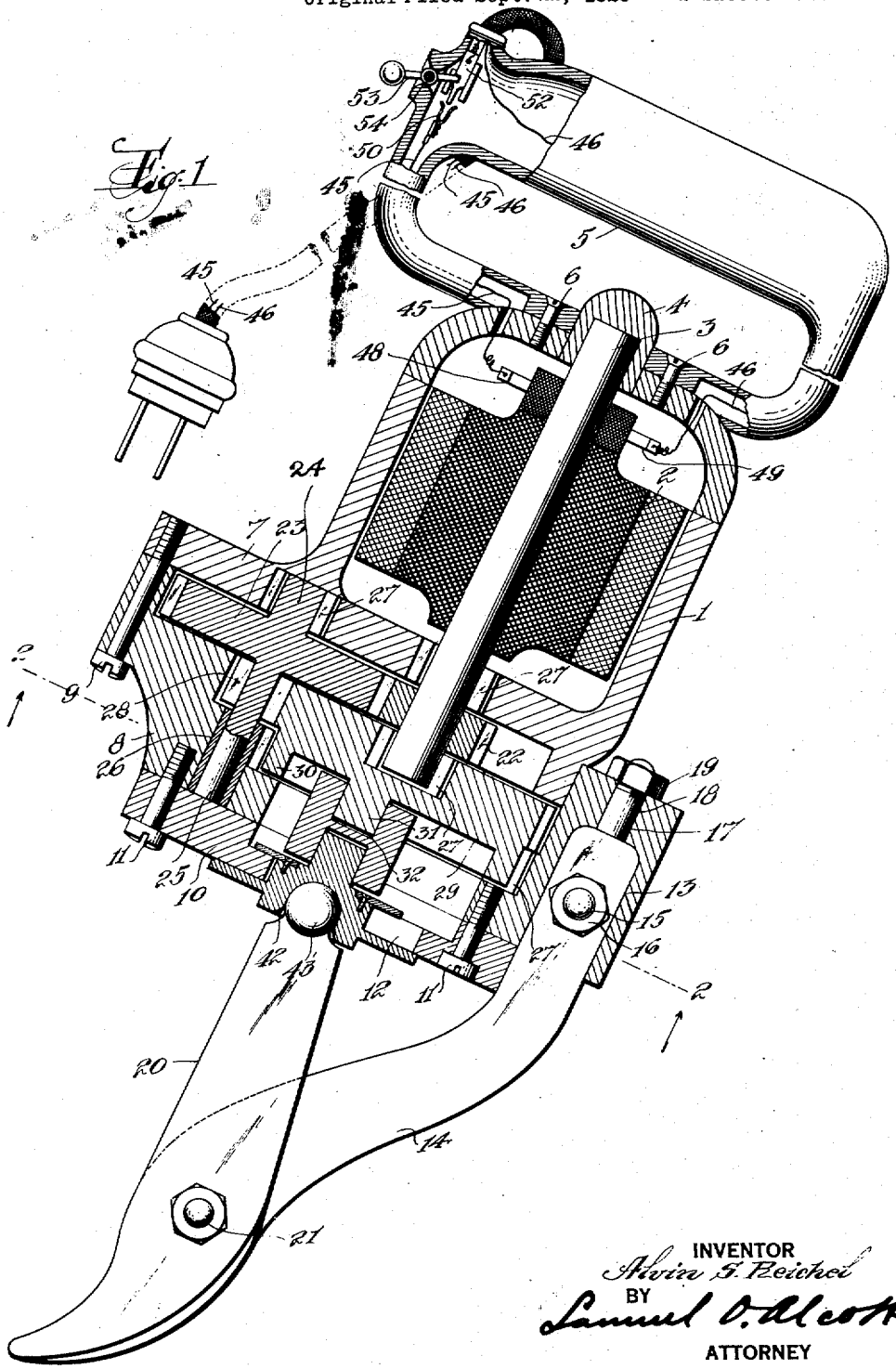

Referring more particularly to the drawings, in which like numerals of reference indicate corresponding parts, 1 represents a motor casing, in which an electric motor 2 is enclosed and functions to drive the motor shaft 3. This shaft, 3, has a thrust bearing in a socket member 4, in one end of casing 1, to which end of said casing a handle 5 is detachably secured, by screws 6, or any other suitable fastening means.

The end of the motor casing 1, opposite that to which the handle 6 is secured, is formed and partially closed with a plate 7, to which a gear casing or chamber 8 is detachably secured by means of screws 9, or any other suitable fastening means. This gear casing or chamber 8 is provided to contain an operatively enclosed gear transmission system and other elements co-operating therewith, to effect the oscillating movement of a movable blade of the cutting shears as shall be hereinafter described. A covering plate 10, for the gear casing or chamber 8, is detachably secured to the outer end of said gear casing or chamber 8, by screws 11, or any other suitable fastening means. This covering plate 10 is provided with a substantially, centrally located slot 12 therein for a purpose which will be hereinafter explained.

The gear casing or chamber 8 is provided with an enlarged portion, on one side thereof, which is formed with a recess 13, to receive one end of a fixed shear blade 14, said blade being securely but detachably held in the recess 13 by a bolt 15, extending through the gear casing 8 and the blade 14, and secured by a nut 16, or by any other suitable fastening means.

Figure 2:
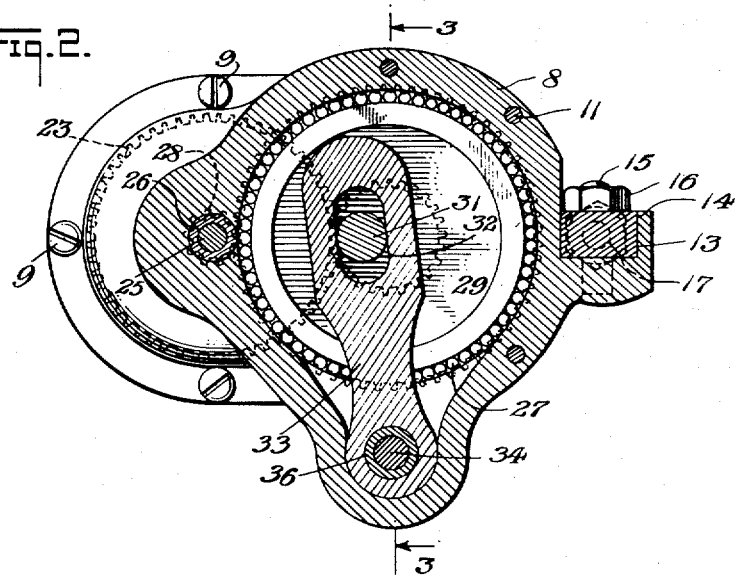
Fig. 2 is a transverse sectional view, taken on line 2—2 of Fig. 1, showing the arrangement of the gear transmission system, the operative relation of the rocker arm co-operating therewith, and the casing within which the rocker arm and gear transmission system are enclosed.

If it is desired to effect a more rigid holding of the stationary blade 14, by means additional to the bolt 15, the blade 14 may be formed with an integral stud 17, which may project through an opening 18, in the end wall of the recess 13, and the blade may be firmly and securely but removably held in said recess by said stud 17 and a nut 19 screwed to the end thereof, as shown in Figs. 1 and 2.

This construction, though not specifically required in my invention, will nevertheless effect a very rigid holding of the blade 14 against accidental displacement from the driving mechanism of the shears, but will, at the same time, permit a ready and convenient removal of the cutting shears from the driving mechanism when desired, and will permit the installation of other cutting shears in combination with the driving mechanism.

By this means, I am able to provide portable motor driven shears of such a type that I may use any variety or character of cutting blades in combination with the driving mechanism, and may thereby, by the one driving mechanism, perform any variety of cutting operations required, without other change than the substitution of one pair of cutting blades for another pair of cutting blades, in combination with the driving mechanism.

Figure 3:
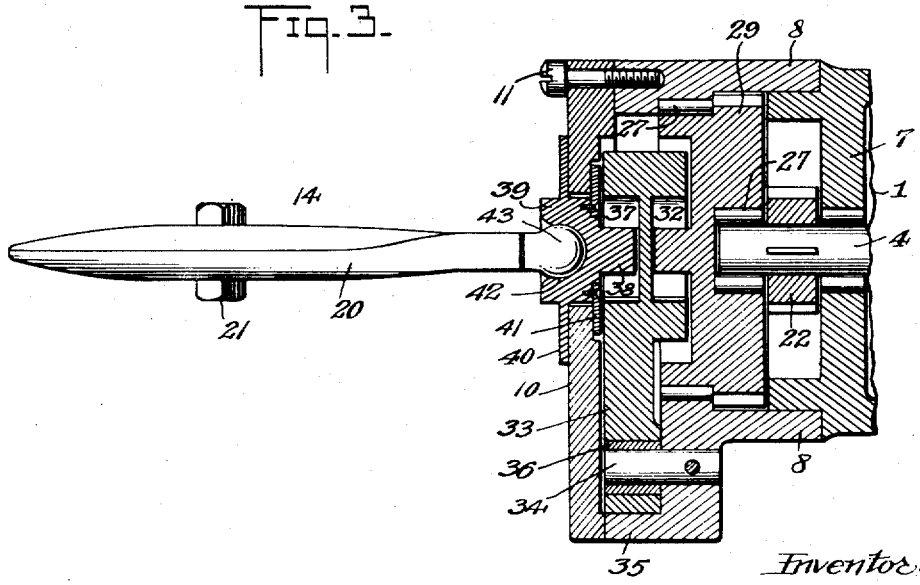
Fig. 3 is a fragmentary, longitudinal, sectional view taken on the line 3—3 of Fig. 2, showing in detail the arrangement of gears comprising the gear transmission system, their relation to the motor shaft and rocker arm, and the means directly connected with the movable blade of the cutting shears to effect an oscillating movement thereof.

Co-operating with the fixed blade 14 of the cutting shears, I provide a movable cutting blade 20, pivoted to the fixed blade 14 by a bolt or rivet 21, or any other suitable means, as is illustrated in Figs. 1 and 3. The movable blade 20 is actuated by my improved arrangement of gear transmission, and other co-operative elements, as will be hereinafter described.

The motor shaft 3, projects from the motor 2, through the end plate 7 of the motor casing 1 and into the gear casing or chamber 8, and near its outer end, is provided with a pinion 22, keyed or otherwise fixed thereon, to rotate therewith. This pinion 22 meshes with a larger gear wheel 23, forming a part of the gear transmission system encased within the gear casing 8.

The gear wheel 23 is shown as having integral trunnions 24 and 25, by means of which the gear 23 is held in operative relation in the gear transmission system; but it is to be clearly understood that these parts may be separate, and arranged in any approved manner which will permit the proper operative holding of the gear 23 as intended; although, for purposes of description I will hereafter refer to them as trunnions 24 and 25. It will be understood, however, that a suitable shaft, upon which the gear 23 might be mounted, and which might be rotated by the rotation of the gear 23, would be a suitable construction for satisfactory operation of my gear transmission system.

The trunnion 24 is supported in operative position on the motor case end plate 7, and the trunnion 25 is supported in operative position in a bushing 26, located in the gear casing 8. Anti-friction bearings are desirable to be employed wherever possible in my apparatus and I have therefore illustrated rolling bearings 27, as the mountings for the several shafts and gears, to effect the maximum reduction of friction during the operation of my device, and to produce thereby the maximum efficiency for the minimum amount of consumption of power.

To the trunnion 25, I fix a pinion 28, so arranged as to rotate with the trunnion 25, and to mesh with a gear wheel 29, which latter gear wheel 29 is loosely mounted on the end of the drive shaft 3, to permit the rotation of said gear wheel 29 thereon. The gear wheel 29 is provided with a peripheral, substantially cylindrical extension 30, having a bearing within the gear casing or chamber 8, said bearing being formed by interposing suitable roller bearings between the extension 30 of the gear wheel 29 and the inner wall of the gear casing 8, so as to reduce friction to a minimum, and to operatively hold the gear 29 in effective position.

Fixed to and projecting from the outer face of the gear wheel 29, I provide a crank pin or eccentric member 31, which is so placed that it is eccentric to and on the gear wheel 29. The crank pin or eccentric member 31 projects into and operates in a recess or longitudinal slot 32, near one end of a rocker arm 33. The rocker arm 33, is pivotally supported at the end opposite that carrying the longitudinal slot 32, by a pin 34, secured in a lateral extension 35 of the gear casing 8, and if desired, preferably provided, at this pivotal bearing, with a bushing 36, located around the pin 34, to sustain the wear of movement of the rocker arm 33, as it rocks backwardly and forwardly upon the pin 34, when actuated by the operation of the gear 29, and the movement of the eccentric member or pin 31, in the recess or longitudinal slot 32.

On the outer face of the rocker arm 33 a longitudinally disposed recess or slot 37 is provided. This slot or recess 37 is arranged in alinement with the recess 32 on the inner face of the rocker arm 33, and receives and holds, in slidable operative relation therewith, a stud 38 on a slidable socket member 39. The socket member 39 is disposed and operates in and extends through the slot 12 in the gear case end plate 10. Forming substantially a part of the socket member 39 is a plate 40, which is slidably arranged against the outer face of the end plate 10 to normally cover the slot 12 therein during the movement of the socket member 39.

Slidably arranged against the inner face of the end plate 10 of the gear case 8 and forming substantially a part of the socket member 39, is a plate 41, removably secured to the socket member 39 by means of screws or other suitable fastening means, and likewise arranged to normally cover the slot 12 in the plate 10, during the movement of the socket member 39. These plates 40 and 41 not only serve as a means to cover the slot 12 in the gear case end plate 10, and thereby prevent dust and dirt from entering the gear case and also preventing the escape of grease or oil through the slot 12 out of the gear case 8, but, by their contact with the inner and outer faces of the end plate 10 they provide a bearing for the movable socket member 39 and hold it against displacement during any operating position of the shears.

On the outer face of the socket member 39 there is a recess or socket 42, shaped to receive and hold in operative relation therewith, a ball-like formation 43, or other similar enlargement, on the end of the movable shear member 20. By this construction it will be seen that the movable blade 20 may be readily coupled to and held in operative relation to the driving mechanism of the shears, when the cutting operation is to be performed, and may as readily be disconnected, uncoupled and removed from the driving mechanism when desired, for repair, or for installation of a new type of cutting members or for other reason.

By this means, I have produced a device having great efficiency and convenience, by virtue of the ability to readily couple to or uncouple from the driving mechanism any desired type of cutting blades.

It is to be understood that since my device is portable, it is intended to be operated by energy received from any suitable or convenient source of electrical supply. In order, therefore, to provide means to conduct this energy from its source to the driving motor 2, and to control the flow of the electric current and the consequent actuation or stopping of the motor at the will of the operator, I construct the handle 5 so that it is hollow, or provided with an interior chamber or conduit 44, through which I may lead electrical conductors 45 and 46, which I may introduce into the handle through a suitably placed inlet 47, and which conductors 45 and 46 may, at their outer ends, be connected in any usual manner to a source of electrical energy. The other ends of the conductors 45 and 46 are connected in any usual manner to brushes 48 and 49 of the driving motor 2 to deliver the electrical energy thereto.

In the circuit of the conductors 45 and 46, I provide a switch, by means of which the flow of the electrical current and the actuation and stopping of the motor 2 may be conveniently and instantly controlled at all times by the operator. This switch is, preferably, for convenience arranged near one end of the grip portion of the handle 5, with a sationery contact member 50 mounted within the chamber 44 of the handle 5 and suitably insulated therefrom, and arranged so that the contact 50 forms a part of the circuit of the conductor 45. Co-operating with the stationery contact member 50, I provide a movable contact member 52, which is connected to and forms a part of the circuit of the conductor 45 and which is attached to one end of a switch lever 53, and may be moved thereby at the will of the operator.

This switch lever 53 is pivoted to the handle 5 near one end of the grip portion thereof, so that it may be conveniently manipulated by the operator of the shears to move the contact member in one direction or another to close or open the circuit of the conductor 45 to the motor, as desired. In order to facilitate this, one end of the switch lever 53 extends out from the handle 5, where it may be easily reached by the operator, while the other end carrying the contact member 52 extends into the chamber 44 of the handle 3, and terminates so that the contact member 52 may be moved into or out of sliding contact with the contact member 50, as the operator may determine, by movement of the lever 53.

When the lever 53 is in the position shown in Fig. 1, so that the contact member 52 is out of contact with the contact member 50, the circuit of the conductor, 45 is then broken and the motor 2 will not be energized for operation, but if the lever 53 is rocked on its pivot 54, so that the contact member 52 is moved into contact with the contact member 50, the circuit of the conductor 45 is then closed and the motor 2 is energized and actuated to operate the cutting blades of the shears.

By this construction, I provide a means conveniently located by which the operator may at all times have perfect control of the starting and stopping of the motor during the cutting operation. Although I have shown and described this specific form of switch, it will be understood that any suitable or modified type of switch may be incorporated in my device that will accomplish the result of effecting a ready and convenient control of the actuation of the motor.

The operation of my device is as follows:

Having connected the conductors 45 and 46 to any suitable source of supply of electrical energy, the motor 2 may be started by operating the switch lever 53, so that the contact 52 is moved into engagement with the contact 50, to close the circuit of the conductor 45 to supply current to the motor. The motor shaft 3 is then rotated by the motor 2 and drives the pinion 22 which is fixed to and rotates with the motor shaft. The rotation of the pinion 22 drives the gear 23, and thereby rotates the pinion 28, which is fixed on and rotates with the trunnion 25 of the gear 23. The pinion 28 meshes with the gear 29, which is loosely mounted on the end of the motor shaft 3, and thereby drives the gear 29. The eccentric member or crank pin 31, carried on the face of the gear 29, being in slidable engagement with the rocker arm 33 in the slot or recess 32 therein, transmits an oscillating or rocking movement to the rocker arm 33, as the gear 29 rotates and the eccentric member or crank pin 31 is moved around its orbit. A stud 38, on the slidable socket member 39, being slidably seated in a second recess 37, near one end of the rocker arm 33, imparts an oscillating back and forth movement to the socket member 39, as the rocker arm 33 is caused to oscillate as before described. The movable blade 20 of the cutting shear members, being coupled to the socket member 39, by means of the ball and socket joint formed by the seating of the ball 43 in the socket 42 of the socket member 39, the oscillating movement of the socket member 39 is transmitted to the movable blade 20 which is thereby caused to rock or oscillate on its pivot 21 and effect the cutting operation.

Although the drawings of this application illustrate shear blades having their cutting jaws closed at their points, yet it is to be understood that since the cutting shears of my device are detachable from the driving mechanism, that I may, if desired, combine with my driving mechanism shears having various types of cutting jaws; such for instance, as shears having cutting jaws so constructed that they do not close at their points, but such modification is so obvious that I have not considered it necessary to illustrate it in the accompanying drawings, it being a feature well known in the art.

Since the amplitude of relative movement of the movable blade of my shears, in reference to the fixed blade, is controlled by the eccentricity of position of the eccentric member or crank pin 31, on the gear 29, it is obvious that I may vary this amplitude of movement by incorporating a gear 29 in the gear transmission system, which shall have its eccentric member or crank pin 31, with reference to the center of the gear 29, at any point desired, either nearer to or farthest from said center than that which is illustrated in the drawings accompanying this application.

It is obvious therefore that, by providing in my device a gear 29 having its eccentric member or crank pin 31 spaced a suitable distance from the gear center, I may so regulate and control the amplitude of movement of the movable blade of the cutting shears, that the cutting jaws of a given pair of shears will not close at their points, during the cutting operation, and that, by the provision of such an eccentric member or crank pin 31, so suitably placed, I have incorporated in my device means which, in co-ordination with means which transmit motion from the eccentric member or crank pin 31 to the movable blade, will constrain the blades against complete closure; but such modification is so obvious that I have not considered it necessary to illustrate it in the accompanying drawing, it being a feature well known in the art.

The construction above described gives great power to the shears, while the mechanism is of comparatively simple construction, is of few parts, occupies but small space, is readily portable, of light weight, readily controlled in its operation, and may be readily manipulated to cut accurately in any direction of straight or curved line, at almost any angle or position.

Although I have described my invention in detail, and shown it in the accompanying drawings, yet I do not wish to be limited thereby, except as the state of the art and the appended claims may require, for, it is obvious that various modifications and changes may be made in the combination, organization, and arrangement of parts of my invention, without departing from the spirit and scope thereof.

What I claim as new and desire to secure by Letters Patent is:

1. A device of the character described, including a gear casing, a power shaft projecting into the gear casing, a fixed shear blade, a movable shear blade, a rocker arm mounted in the casing, a socket member operatively engaging the rocker arm and movably connected to the movable shear blade, a gear wheel located in axial alinement with the drive shaft, a crank pin on the gear wheel operatively connected to the rocker arm, and a gear train transmitting motion from the power shaft to the said last mentioned gear.

2. A device of the character described, including a motor casing, a handle fixed to one end of the casing, a gear casing fixed to the other end of the motor casing, a rocker arm pivotally mounted in the gear casing and having longitudinal recesses in opposite sides thereof, a covering plate secured to the gear casing and having a guide slot therein, a socket member movable in said slot, plates on the socket member covering the slot, a shear blade fixed to the casing, a movable shear blade operatively connected to the socket member, a gear wheel in the casing, a crank pin on the gear wheel engaging in one of the recesses in the rocker arm, a motor shaft projecting into the gear casing, and a gear train connecting the shaft with the first mentioned gear wheel.

3. In a motor shears, the combination of a casing, a motor encased in said casing, means to transmit energy to said motor, a handle on one end of said casing, a gear system encased in said casing and actuated by said motor, a fixed shear blade detachably mounted on said casing, a movable shear blade, a rocker arm mounted in said casing, a socket member operatively engaging said rocker arm and movably and detachably connected to the movable shear blade, a member eccentric to and on one of the gears of said gear system operatively connected to the rocker arm, to transmit oscillating motion to said rocker arm, socket member, and movable shear blade.

4. In a motor shears, the combination of a casing, a motor encased in said casing, means to transmit energy to said motor, a gear system in said casing and actuated by said motor, a fixed shear blade detachably mounted on said casing, a movable shear blade cooperatively associated therewith, a socket member movably and detachably connected to said movable shear blade, a member eccentric and on one of the gears of said system, and means operatively connected to said eccentric and said socket member, to translate rotary movement of the gear system to oscillating movement of the socket member and movable blade.

5. In a motor shears, the combination of a casing, a motor encased in said casing, means to transmit energy to said motor, a gear system in said casing and actuated by said motor, a fixed shear blade detachably mounted on said casing, a movable shear blade operably pivoted to said fixed shear blade, a socket member movably and detachably connected to said movable shear blade, slidably mounted on said casing, a member eccentric to and on one of the gears of said gear system, and means engaging said eccentric and said socket member, to translate the rotary movement of said gear system to oscillating movement of said socket member and movable blade.

6. In a motor shears, the combination of a casing, a motor encased therein, means to transmit energy to said motor, a gear system in said casing and actuated by said motor, a fixed shear blade detachably mounted on said casing, a movable shear blade operably pivoted to said fixed shear blade, a member eccentric to and on one of the gears of said gear system, and means movably and detachably connected to said movable shear blade, slidably mounted on said casing and operatively connected to said eccentric member, to translate the rotary movement of said gear system and eccentric to oscillating movement of said movable shear blade.

7. In a motor shears, the combination of a casing, a motor encased therein, means to transmit energy to said motor, a switch carried by said casing to control the delivery of energy to said motor, a gear system within said casing and actuated by said motor, a fixed shear blade detachably mounted on said casing, a movable shear blade operably pivoted to said fixed shear blade, a member eccentric to and on one of said gears of said gear system, a socket member movably and detachably connected to said movable shear blade, slidably mounted on said casing, extending therethrough and having a recess on its outer face, and means operatively connecting said socket member and said eccentric member, to translate the rotary movement of said motor to oscillating movement of said movable shear blade.

8. In a motor shears, the combination of a casing, a motor encased therein, means to transmit energy to said motor, a switch carried by said casing to control the delivery of energy to said motor, a gear system within said casing and actuated by said motor, a fixed shear blade detachably mounted on said casing, a movable shear blade, operatively pivoted to said fixed shear blade, a member eccentric to and on one of said gears of said gear system, and means independent of said movable shear blade, but detachably connected thereto, slidably mounted on said casing and operatively connected to said eccentric member, to translate the rotary movement of said motor to oscillating, rapid, small amplitude movement of said movable shear blade, relatively to said fixed shear blade.

9. In a motor shears, the combination of a casing, a motor encased therein, means to transmit energy to said motor, a gear system within said casing and actuated by said motor, a fixed shear blade detachably mounted on said casing, a movable shear blade operatively pivoted to said fixed shear blade, a socket member detachably connected to said movable shear blade, slidably mounted on said casing, a rocker arm within said casing independent of said movable shear blade, movably connected to said socket member, and a member eccentric to and on one of said gears of said gear system, operably connected with said rocker arm, adapted to actuate said rocker arm and socket member, to translate the rotary movement of said gears to oscillating movement of said movable shear blade.

Signed at city of Scranton in the county of Lackawanna, State of Pennsylvania, this 15th day of March, 1928.

ALVIN S. REICHEL.